(12) United States Patent
Ino et al.

(10) Patent No.: US 11,114,084 B2
(45) Date of Patent: Sep. 7, 2021

(54) RESONANCE TUBE OF HORN

(71) Applicant: MAZDA MOTOR CORPORATION, Hiroshima (JP)

(72) Inventors: Hisanobu Ino, Aki-gun (JP); Ikuyo Ohsugi, Hatsukaichi (JP); Masaaki Sakiyama, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 548 days.

(21) Appl. No.: 16/082,639

(22) PCT Filed: Mar. 6, 2017

(86) PCT No.: PCT/JP2017/008784
§ 371 (c)(1),
(2) Date: Sep. 6, 2018

(87) PCT Pub. No.: WO2017/163838
PCT Pub. Date: Sep. 28, 2017

(65) Prior Publication Data
US 2019/0066655 A1    Feb. 28, 2019

(30) Foreign Application Priority Data

Mar. 25, 2016    (JP) .............................. JP2016-061619

(51) Int. Cl.
*G10K 11/22*    (2006.01)
*B60Q 5/00*    (2006.01)
(Continued)

(52) U.S. Cl.
CPC ................ *G10K 11/22* (2013.01); *B60Q 5/00* (2013.01); *G10K 9/13* (2013.01); *G10K 9/22* (2013.01);
(Continued)

(58) Field of Classification Search
CPC . G10K 11/22; G10K 9/13; G10K 9/22; G10K 13/00; B60Q 5/00; H04R 1/2865
(Continued)

(56) References Cited

U.S. PATENT DOCUMENTS

2002/0118601 A1*    8/2002    Freund ................... G10K 15/04
                                                                    367/137
2002/0150275 A1*    10/2002    Guenther ............... H04R 9/025
                                                                    381/398
(Continued)

FOREIGN PATENT DOCUMENTS

DE    102008041779 A1    2/2010
DE    102012109002 A1    6/2014
(Continued)

OTHER PUBLICATIONS

European Patent Office, Extended European Search Report Issued in Application No. 17769883.4, dated Jan. 21, 2019, Germany, 7 pages.

*Primary Examiner* — Kerri L McNally
(74) *Attorney, Agent, or Firm* — Alleman Hall Creasman & Tuttle LLP

(57) ABSTRACT

A resonance tube of a horn according to one aspect of the present invention includes a first resonance tube and a second resonance tube branching from the first resonance tube at a branching portion. The first resonance tube is a resonance tube that resonates with a first sound contained in a chord generated by a diaphragm. The first resonance tube includes: an input opening surface to which the chord is input; and a first opening surface from which the first sound is output. The second resonance tube is a resonance tube that resonates with a second sound contained in the chord. The second resonance tube includes a second opening surface from which the second sound is output. The second opening (Continued)

surface is displaced from the first opening surface in a normal direction K1.

7 Claims, 9 Drawing Sheets

(51) Int. Cl.
  *G10K 9/13* (2006.01)
  *G10K 9/22* (2006.01)
  *G10K 13/00* (2006.01)
  *H04R 1/28* (2006.01)

(52) U.S. Cl.
  CPC ........... *G10K 13/00* (2013.01); *H04R 1/2865* (2013.01); *H04R 2499/13* (2013.01)

(58) Field of Classification Search
  USPC .......................................................... 181/187
  See application file for complete search history.

(56) References Cited

U.S. PATENT DOCUMENTS

| | | | | |
|---|---|---|---|---|
| 2007/0103276 | A1* | 5/2007 | Kousaka | G10K 9/13 340/388.1 |
| 2010/0119096 | A1* | 5/2010 | Suzuki | G10K 9/20 381/340 |
| 2012/0092185 | A1* | 4/2012 | Hayashi | B60Q 5/008 340/904 |
| 2012/0194329 | A1* | 8/2012 | Nakayama | B06B 1/0276 340/425.5 |
| 2013/0106590 | A1* | 5/2013 | Nakayama | B60Q 5/008 340/425.5 |
| 2014/0363019 | A1* | 12/2014 | Funahashi | B60R 13/005 381/86 |

FOREIGN PATENT DOCUMENTS

| | | |
|---|---|---|
| JP | 2008089627 A | 4/2008 |
| JP | 2011076018 A | 4/2011 |

* cited by examiner

RESONANCE TUBE OF HORN

TECHNICAL FIELD

The present invention relates to a resonance tube of a horn mounted on a vehicle.

BACKGROUND ART

A horn, which vibrates a diaphragm with a movable core and outputs the sound generated by the diaphragm to the outside through a resonance tube, is mounted on a vehicle. The reason why the resonance tube is provided is because if the sound generated by the diaphragm is directly output, adequate sound pressure required as horn sound cannot be obtained. Since the resonance tube has a spiral shape, there is a problem that foreign matter such as water cannot be removed if the foreign matter enters and accumulates in the resonance tube. Thus, PTL 1 discloses an electric horn for a vehicle, in which a foreign matter entry prevention member is affixed to a sound wave outlet opening portion of a resonance tube to prevent foreign matter flying from the front side of the vehicle from entering the resonance tube.

CITATION LIST

Patent Literature

PTL 1: Japanese Laid-Open Patent Application Publication No. 2011-76018

SUMMARY OF INVENTION

Technical Problem

If the sound output from the horn is made a chord, a sound comfortable to a passenger is output, which is considered to enhance enjoyment of driving. In this case, resonance tubes which resonate with respective first and second sounds constituting the chord are required.

However, in PTL 1, there is a problem that since only one resonance tube is provided, the resonance tube can resonate with only one of the first and second sounds, and therefore, the chord having adequate sound pressure cannot be output.

An object of the present invention is to provide a resonance tube of a horn, the resonance tube being capable of outputting a chord having adequate sound pressure.

Solution to Problem

A resonance tube according to one aspect of the present invention is a resonance tube of a horn mounted on a vehicle, the resonance tube including: a main resonance tube including an input opening surface to which a chord is input, the chord containing a first sound and a second sound, the first sound having a first frequency as a fundamental frequency, the second sound having a second frequency as a fundamental frequency, the second frequency constituting the chord together with the first frequency; and a branch resonance tube branching from the main resonance tube, wherein: one of the main resonance tube and the branch resonance tube serves as a first resonance tube that resonates with the first sound; the other of the main resonance tube and the branch resonance tube serves as a second resonance tube that resonates with the second sound; the first resonance tube includes a first opening surface from which the resonated first sound is output; the second resonance tube includes a second opening surface from which the resonated second sound is output; and the second opening surface is displaced from the first opening surface in a normal direction of the first opening surface.

According to the present aspect, the first sound of the chord input to the input opening surface is output from the first opening surface of the first resonance tube, and the second sound of the chord is output from the second opening surface of the second resonance tube. With this, the first and second sounds each having high sound pressure can be output.

The sound pressures output from the respective first and second opening surfaces when the first and second opening surfaces were aligned with each other were measured. High sound pressures were obtained in the vicinity of the first and second opening surfaces. However, the sounds output from the first and second opening surfaces interfered with each other at the front side of these opening surfaces, and therefore, adequate sound pressure was not obtained. Further, the frequency characteristics of the measured sound pressures were analyzed. It was found that high peaks were observed at the higher harmonic components of the first and second frequencies, but the sound pressure largely dropped at a specific frequency between the higher harmonic components.

It is generally known that as the temperature decreases, the frequency characteristic of the sound pressure shifts to the low-frequency side. Therefore, if the sound pressure drops at the specific frequency, there occurs a problem that: depending on the temperature around the horn, the target frequency of the first or second sound coincides with the frequency at which the sound pressure drops; and therefore, the first or second sound having adequate sound pressure cannot be obtained.

Therefore, the present inventors performed the same measurement as above except that the first and second opening surfaces of the first and second resonance tubes were displaced from each other in the normal direction. As a result, it was confirmed that adequate sound pressure could be obtained even at the front side of the first and second opening surfaces. Further, the frequency characteristics in this case were analyzed. It was confirmed that the sound pressure drop at the specific frequency was also significantly improved.

Thus, according to the present aspect, the chord having adequate sound pressure can be output, and the sound pressure can be prevented from dropping at the target frequency due to a temperature change.

In the above aspect, the resonance tube may be configured such that: the first resonance tube includes a first spiral portion extending spirally and a first linear portion extending linearly toward a lower side of the vehicle from the first spiral portion to the first opening surface; and the second resonance tube includes a second spiral portion extending spirally and a second linear portion extending adjacent to the first linear portion from the second spiral portion to the second opening surface such that the second opening surface is located at an upper side of the first opening surface in the vehicle, and the resonance tube may further include a cover covering the second opening surface to prevent entry of water.

When the resonance tube is formed spirally, and water enters through the opening surface, the water is accumulated in the resonance tube, and removal of the water is difficult.

According to the present aspect, the first and second resonance tubes include the respective first and second linear portions extending toward the lower side of the vehicle.

Therefore, even if water enters through the first and second opening surfaces, the water drops before reaching the first and second spiral portions. Thus, the water can be prevented from being accumulated in the first and second spiral portions.

It should be noted that since an entire length of the second linear portion is shorter than an entire length of the first linear portion, a possibility that the water enters the second spiral portion is higher than a possibility that the water enters the first linear portion. Therefore, according to the present aspect, the second opening surface of the second linear portion is located an upper side of the first opening surface in the vehicle and is arranged adjacent to the first linear portion. With this, the first linear portion serves as a wall, and water flying from the first linear portion side can be prevented from entering the second linear portion through the second opening surface. However, there is still a possibility that water flying from directions other than the first linear portion side enters the second linear portion through the second opening surface. Therefore, the present aspect includes the cover covering the second opening surface to prevent entry of water. With this, the water flying from directions other than the first linear portion side can be prevented from entering the second linear portion through the second opening surface.

In the above aspect, the cover may be attached to the second linear portion with a gap from a frame of the second opening surface.

According to the present aspect, the cover is attached to the second linear portion with a gap from the frame of the second opening surface. Therefore, it is possible to prevent a case where the cover itself becomes a part of the second resonance tube, and therefore, the entire length of the second resonance tube is practically extended.

In the above aspect, the resonance tube may be configured such that: the first and second resonance tubes are spirally arranged adjacent to each other; one of the first and second resonance tubes has a longer entire length than the other of the first and second resonance tubes; and the other of the first and second resonance tubes is wound at an inner side of the one of the first and second resonance tubes.

According to the present aspect, a shorter one of the first and second resonance tubes is wound inside a longer one of the first and second resonance tubes. Therefore, the longer resonance tube can prevent water from entering the shorter resonance tube.

In the above aspect, the resonance tube may be configured such that: the chord is generated by a diaphragm in which a support point of a movable core is provided at a position that is eccentric from a center of the diaphragm; and the input opening surface is provided above the center of the diaphragm.

The present inventors have confirmed that the chord is generated by vibrating the diaphragm in which the support point of the movable core is provided at a position that is eccentric from the center of the diaphragm. The present inventors have also confirmed that in this case, when the input opening surface is provided above the center of the diaphragm, not above the support point, the sound pressure of the chord becomes high. Therefore, according to the present aspect, the chord having high sound pressure can be obtained.

Advantageous Effects of the Invention

The present invention can provide the resonance tube of the horn, the resonance tube being capable of outputting the chord having the adequate sound pressure.

BRIEF DESCRIPTIONS OF THE DRAWINGS

DESCRIPTIONS OF THE EMBODIMENTS

Figure 1:
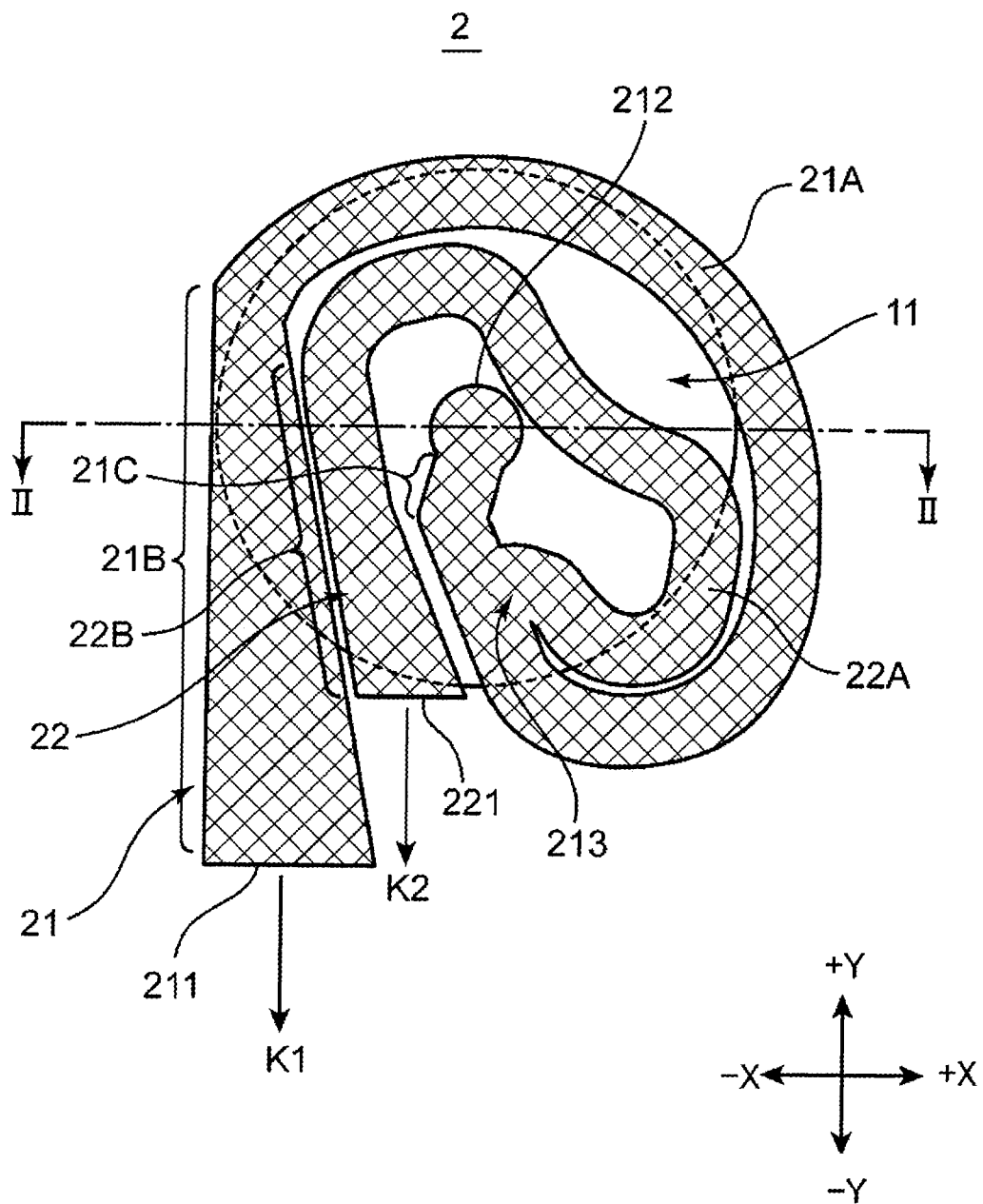
FIG. 1 is an appearance diagram of a resonance tube according to an embodiment of the present invention.
Figure 2:
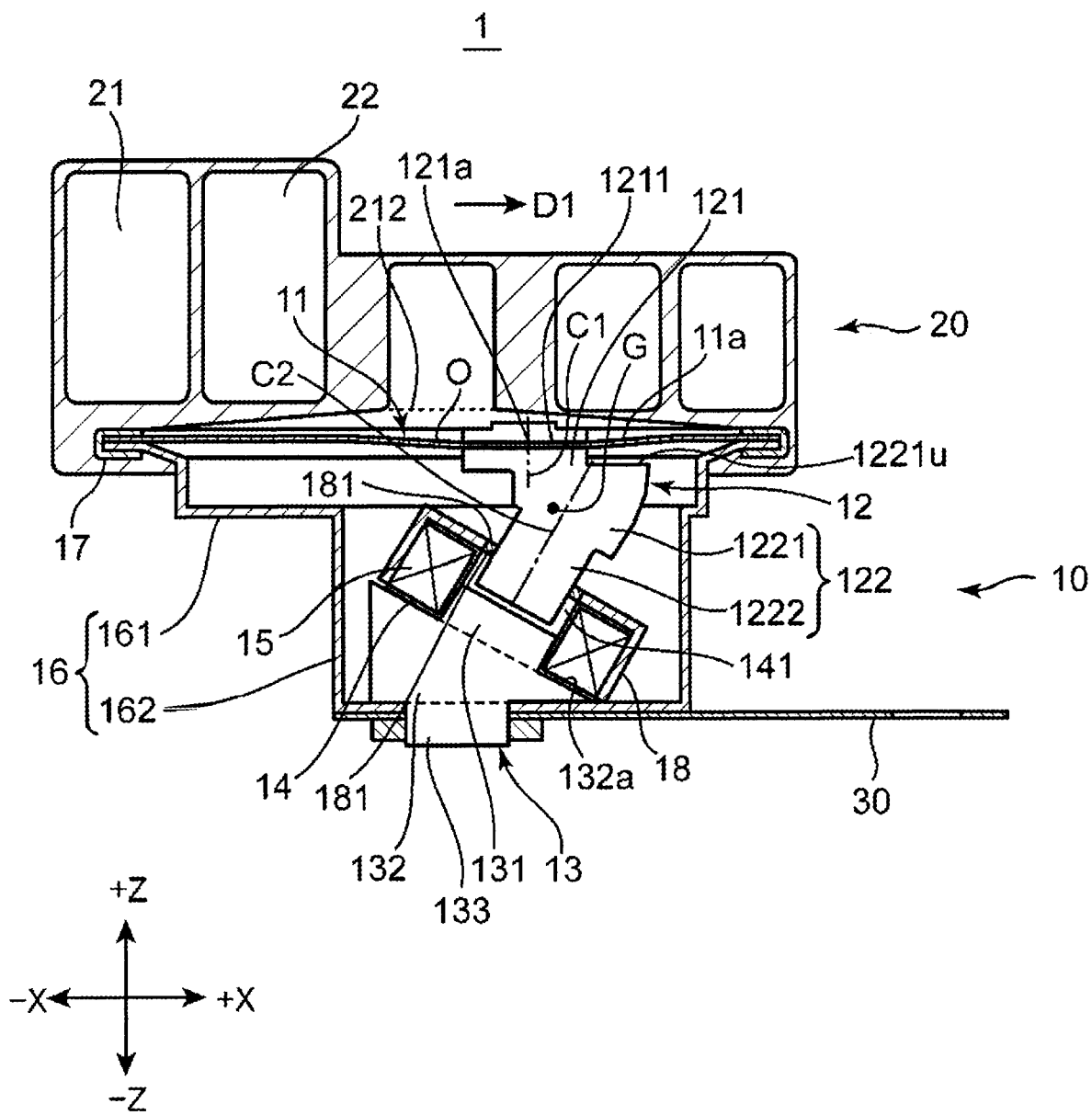
FIG. 2 is a diagram showing an entire configuration of a horn to which the resonance tube shown in FIG. 1 is applied.

FIG. 1 is an appearance diagram of a resonance tube 2 according to an embodiment of the present invention. FIG. 2 is a diagram showing an entire configuration of a horn 1 to which the resonance tube 2 shown in FIG. 1 is applied. On the paper surface of FIG. 1, an upper direction is referred to as a +Y direction, a lower direction is referred to as a −Y direction, and both the upper and lower directions are collectively referred to as a Y direction. Further, on the paper surface of FIG. 1, a left direction is referred to as a −X direction, a right direction is referred to as a +X direction, and both the left and right directions are collectively referred to as an X direction. Furthermore, as shown in FIG. 2, a direction perpendicular to the X direction and the Y direction is referred to as a Z direction, an upper direction along the Z direction on the paper surface is referred to as a +Z direction, and a lower direction along the Z direction on the paper surface is referred to as a −Z direction.

Referring to FIG. 1, the resonance tube 2 includes a first resonance tube 21 and a second resonance tube 22 branching from the first resonance tube 21 at a branching portion 213. The first resonance tube 21 is a resonance tube that resonates with a first sound contained in a chord generated by a diaphragm 11. The first resonance tube 21 includes: an input opening surface 212 to which the chord is input; and a first opening surface 211 from which the first sound is output.

The first resonance tube 21 includes: a base portion 21C extending from the input opening surface 212 to the branching portion 213; a first spiral portion 21A spirally extending from the base portion 21C; and a first linear portion 21B linearly extending from the first spiral portion 21A to the first opening surface 211.

The first spiral portion 21A extends from the base portion 21C to the first linear portion 21B while curving counterclockwise so as to surround the input opening surface 212. Specifically, the first spiral portion 21A extends from the base portion 21C through a −Y direction-side top portion, a +X direction-side top portion, and a +Y direction-side top portion to the first linear portion 21B located at a −X direction side of the input opening surface 212.

The first linear portion 21B is configured such that a cross section thereof increases in area toward the first opening surface 211. Further, the first linear portion 21B extends linearly in the −Y direction while inclining toward the +X direction. In the present embodiment, since the −Y direction corresponds to a lower side of the vehicle, the first linear portion 21B extends linearly toward the lower side of the vehicle.

The base portion 21C extends from the input opening surface 212 in the −Y direction and communicates with the first spiral portion 21A. The branching portion 213 is provided in the vicinity of a starting point of the first spiral portion 21A and causes the first spiral portion 21A and a second spiral portion 22A to communicate with each other.

The second resonance tube 22 is a resonance tube that resonates with a second sound contained in the chord. The second resonance tube 22 includes a second opening surface 221 from which the second sound is output.

The second resonance tube 22 includes: the second spiral portion 22A extending spirally from the branching portion 213; and a second linear portion 22B extending linearly from the second spiral portion 22A to the second opening surface 221.

The second spiral portion 22A is surrounded by the first spiral portion 21A and extends from the branching portion 213 to the second linear portion 22B while curving counterclockwise so as to surround the input opening surface 212. Specifically, the second spiral portion 22A extends through a −Y direction-side top portion, a +X direction-side top portion, and a +Y direction-side top portion to the second linear portion 22B located at a −X direction side of the input opening surface 212. In the present embodiment, cross sections of the first and second spiral portions 21A and 22A are constant. However, the present embodiment is not limited to this.

The second linear portion 22B is configured such that a cross section thereof increases in area toward the second opening surface 221. Further, the second linear portion 22B extends linearly along the first linear portion 21B at an inner side of the first linear portion 21B. In the present embodiment, since the −Y direction corresponds to the lower side of the vehicle, the second linear portion 22B extends linearly toward the lower side of the vehicle as with the first linear portion 21B. The second opening surface 221 is located at a +Y direction side of the first opening surface 211, and starting points of the first and second linear portions 21B and 22B are substantially the same in position as each other in the Y direction. Therefore, an entire length of the second linear portion 22B is shorter than an entire length of the first linear portion 21B.

Each of the first and second opening surfaces 211 and 221 is, for example, a quadrangular flat surface, and normal directions K1 and K2 are parallel to each other. The normal directions K1 and K2 extend in the −Y direction. The second opening surface 221 is displaced from the first opening surface 211 in the normal direction K1. Therefore, as described below, the resonance tube 2 can output the chord having high sound pressure.

The input opening surface 212 is provided at a center of the diaphragm 11 and is, for example, a circular flat surface perpendicular to the Z direction shown in FIG. 2.

The following will be explained with reference to FIG. 2. For convenience of explanation, directions on the paper surface of FIG. 2 are used. As shown in FIG. 2, the horn 1 includes a sound source device 10 and the resonance tube 2. The sound source device 10 generates sound, and the resonance tube 2 is provided at an upper side of the sound source device 10 and resonates with the sound output from the sound source device 10.

The sound source device 10 includes the diaphragm 11, a movable core 12, a fixed core 13, a bobbin 14, a winding 15, a case 16, an outer frame 17, a coil case 18, and a bracket 30. The movable core 12 is connected to the diaphragm 11 through a support point region 1211. The fixed core 13 is provided at a lower side of the movable core 12. The bobbin 14 and the winding 15 constitute a coil. The case 16 accommodates the movable core 12, the fixed core 13, the bobbin 14, and the winding 15. The outer frame 17 attaches the outer edge of the diaphragm 11 to the outer edge of the case 16. The coil case 18 covers an upper side and lateral side of the bobbin 14. The bracket 30 is attached to a lower side of a bottom surface of the case 16.

The diaphragm 11 is made of, for example, flexible discoid metal, vibrates by the vibration of the movable core 12, and outputs sound. The diaphragm 11 is placed on a circular edge provided at the uppermost side of the case 16 and fixed to the case 16 by being fitted by the outer frame 17. The diaphragm 11 is provided with a taper 11a in which a certain region surrounding a support portion 121 is conically inclined toward the lower side so that the diaphragm 11 is easily vibrated.

The movable core 12 is made of a magnetic material and includes the support portion 121 and a main body portion 122. The support portion 121 is connected to the diaphragm 11 through the support point region 1211. The main body portion 122 is provided at a lower side of the support portion 121.

The support portion 121 is cylindrical and sandwiches the support point region 1211 from both sides in a vertical direction. The support portion 121 is provided at a position where the center of the support point region 1211 (hereinafter referred to as a "support point 121a") is eccentric to a right side of a center O of the diaphragm 11. Herein, the direction in which the support point 121a is eccentric (herein, the right side) is described as an eccentric direction D1.

The main body portion 122 as a whole is constituted by a cylindrical member that is longer than the support portion 121, and an upper end portion of a central axis C2 is displaced from a central axis C1 of the support portion 121 in the eccentric direction D1. It should be noted that the central axis C1 is directed in the vertical direction, that is, a direction orthogonal to the diaphragm 11, and passes through the support point 121a. In the example in FIG. 2, the central axis C2 is inclined obliquely downward to the left side with respect to the vertical direction. Thus, a gravity center G of the movable core 12 is displaced in the eccentric direction D1. Specifically, the main body portion 122 includes a cylindrical portion 1222 and a bent portion 1221. The cylindrical portion 1222 is cylindrical and has the central axis C2 as a longitudinal direction. The bent portion 1221 is provided at an upper side of the cylindrical portion 1222 and bent toward the support portion 121.

In the example in FIG. 2, in order to displace the gravity center G further in the eccentric direction D1 than the support point 121a, the bent portion 1221 protrudes in the eccentric direction D1. Therefore, an upper surface 1221u of the bent portion 1221 is exposed.

The fixed core 13 includes a pedestal portion 132, a salient portion 131, and an engagement portion 133. The salient portion 131 protrudes from a center of an upper surface of the pedestal portion 132 in a direction along the central axis C2. The engagement portion 133 protrudes downward from a lower surface of the pedestal portion 132. The pedestal portion 132 has an upper surface 132a orthogonal to the central axis C2, and the bobbin 14 is placed thereon. The salient portion 131 enters a hole 141 provided along a central axis of the bobbin 14 so that the bobbin 14 is fitted. The engagement portion 133 is fitted into a hole provided at a bottom surface of the case 16. Thus, the fixed core 13 is fixed inside the case 16.

The bobbin 14 is constituted by a drum-shaped member around which the winding 15 is wound. The movable core 12 is inserted into the hole 141 from an upper side of the bobbin 14. A diameter of the hole 141 is slightly larger than a diameter of the cylindrical portion 1222 of the movable core 12. Thus, in addition to the vibration along the central axis C2, the movable core 12 is made capable of swinging about the support point 121a.

A signal generating device (not shown) is connected to the winding 15, and a driving signal, which includes a first signal component of a first frequency that resonates with the diaphragm 11 and a second signal component of a second frequency that resonates with the movable core 12, is input thereto.

The coil case 18 is provided above the pedestal portion 132 so as to cover an upper side of the bobbin 14 and an outer peripheral surface of the winding 15. The hole through which the movable core 12 is inserted into the bobbin 14 is formed at a center of an upper surface of the coil case 18. Further, a packing 181 is attached to an inner periphery of the hole of the coil case 18. This packing 181 closes a space between the coil case 18 and the movable core 12 and supports the movable core 12.

The case 16 includes a discoid upper portion 161 and a lower portion 162 provided at a lower side of the upper portion 161. The upper portion 161 has a cross section that is concentric with the diaphragm 11. The lower portion 162 has a cross section that is concentric with the support point 121a. The lower portion 162 also has a cylindrical shape that is longer in the vertical direction than the upper portion 161.

The bracket 30 has a rectangular shape extending to the right side from a lower surface of the lower portion 162 and is provided with a hole at a right end thereof for attaching the horn 1 to an inside of the vehicle.

The operation of the sound source device 10 shown in FIG. 2 will be briefly described. When the driving signal from the signal generating device (not shown) is applied to the winding 15, the movable core 12 is driven by receiving electromagnetic force from the winding 15. Herein, since the first signal component included in the driving signal has the first frequency that resonates with the diaphragm 11, the diaphragm 11 vibrates in the vertical direction by the movable core 12. Thus, the diaphragm 11 generates the first sound with the first frequency as a fundamental frequency. Further, since the second signal component included in the driving signal has the second frequency that resonates with the movable core 12, the movable core 12 swings about the support point 121a. Thus, the diaphragm 11 generates the second sound with the second frequency as a fundamental frequency.

As the first frequency and the second frequency, an imperfect consonance may be adopted, or a perfect consonance may be adopted. Herein, an imperfect consonance with the first and second frequencies having a frequency ratio of 1.25 is adopted. However, the present embodiment is not limited to this.

The following will be explained on the basis that the first frequency is 400 Hz, and the second frequency is 500 Hz that is higher than the first frequency. Therefore, the first resonance tube 21 has such an entire length as to be able to resonate with 400 Hz, and the second resonance tube 22 and the base portion 21C have such an entire length as to be able to resonate with 500 Hz.

Figure 3:
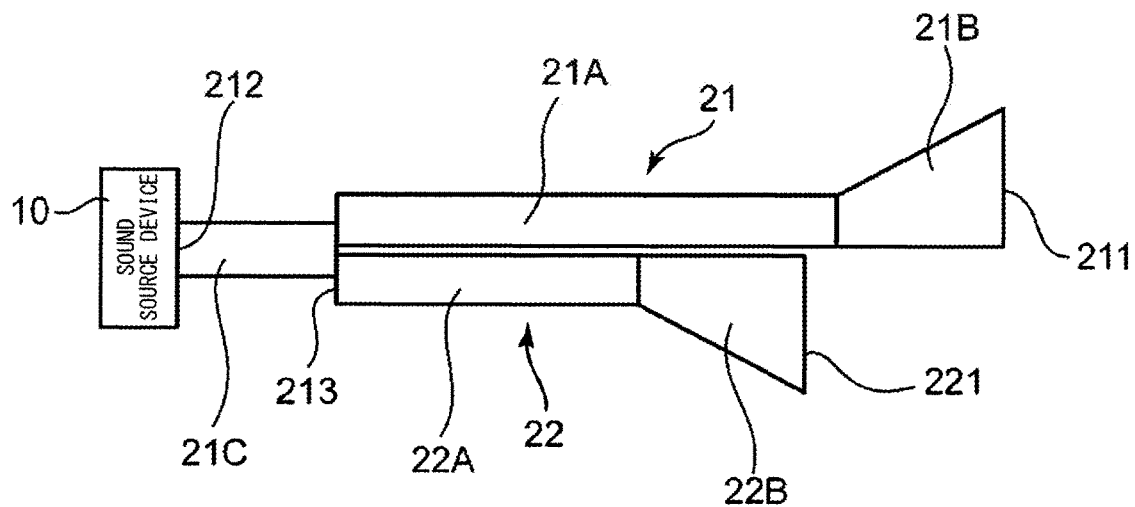
FIG. 3 is a diagram conceptually showing the configuration of the resonance tube shown in FIG. 1.

FIG. 3 is a diagram conceptually showing the configuration of the resonance tube 2 shown in FIG. 1. As shown in FIG. 3, the first resonance tube 21 includes the base portion 21C, the first spiral portion 21A, and the first linear portion 21B, which are lined up in this order from the sound source device 10 side. The second resonance tube 22 includes the second spiral portion 22A and the second linear portion 22B, which are lined up in this order from the branching portion 213 side.

Figure 4:
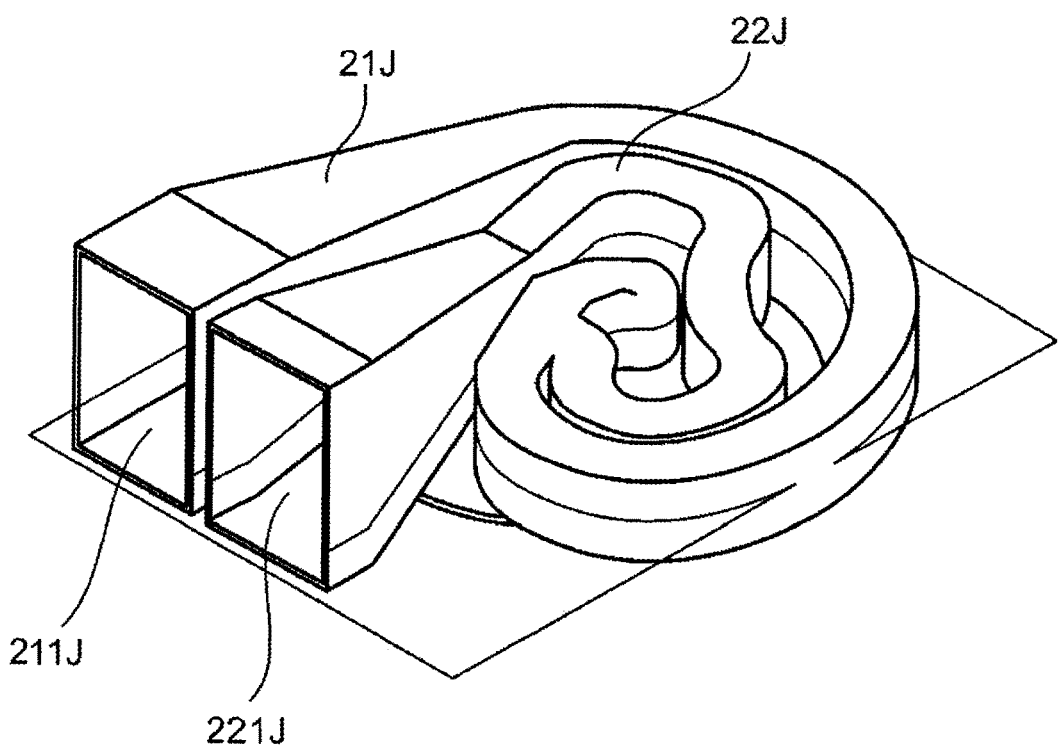
FIG. 4 is a diagram showing the configuration of the resonance tube according to Comparative Example of the present embodiment.

FIG. 4 is a diagram showing the configuration of a resonance tube 2J according to Comparative Example of the present embodiment. As with the resonance tube 2, the resonance tube 2J includes: a first resonance tube 21J that resonates with the first sound; and a second resonance tube 22J that branches from the first resonance tube 21J and resonates with the second sound. However, unlike the resonance tube 2, the positions of first and second opening surfaces 211J and 221J in the resonance tube 2J are aligned with each other.

Figure 5:
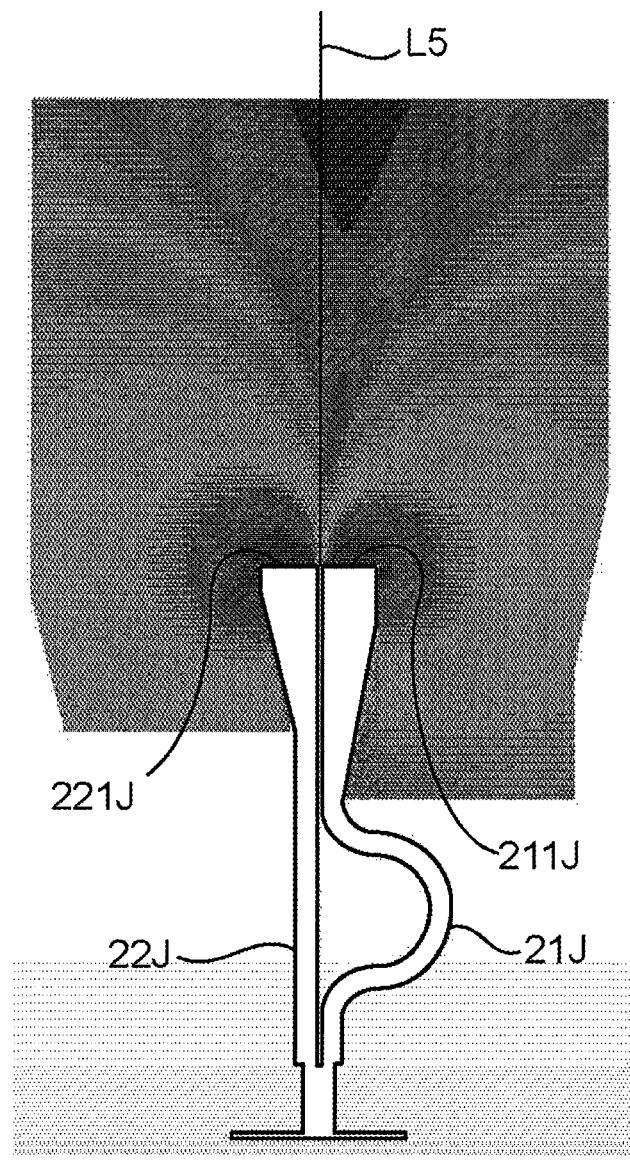
FIG. 5 is a diagram showing a sound pressure distribution of the resonance tube according to Comparative Example of the present embodiment.

FIG. 5 is a diagram showing a sound pressure distribution of the resonance tube 2J according to Comparative Example of the present embodiment. In FIG. 5, the sound pressure decreases in a direction away from a center of concentric circles. The same is true for FIG. 6 described later. A spiral portion of the resonance tube 2J shown in FIG. 4 is shown linearly in FIG. 5, but there is no essential difference between the resonance tube 2J shown in FIG. 5 and the resonance tube 2J shown in FIG. 4.

As shown by the sound pressure distribution in FIG. 5, in the resonance tube 2J, there are two peaks at the respective first and second opening surfaces 211J and 221J, and the sound pressure distributes so as to gradually decrease concentrically from each peak. Further, it is shown that the sound pressure is substantially symmetrical about a line L5. It should be noted that the line L5 is a line parallel to a longitudinal direction of the second resonance tube 22J and extending through a middle between the first opening surface 211J and the second opening surface 221J.

Further, it is shown that: the sound pressure on the line L5 is significantly low; and a region where the sound pressure is significantly low spreads from the line L5 toward a front side of the first and second opening surfaces 211J and 221J. This is because since the positions of the first and second opening surfaces 211J and 221J are aligned with each other, the sounds output from both of the opening surfaces interfere with each other.

Figure 6:
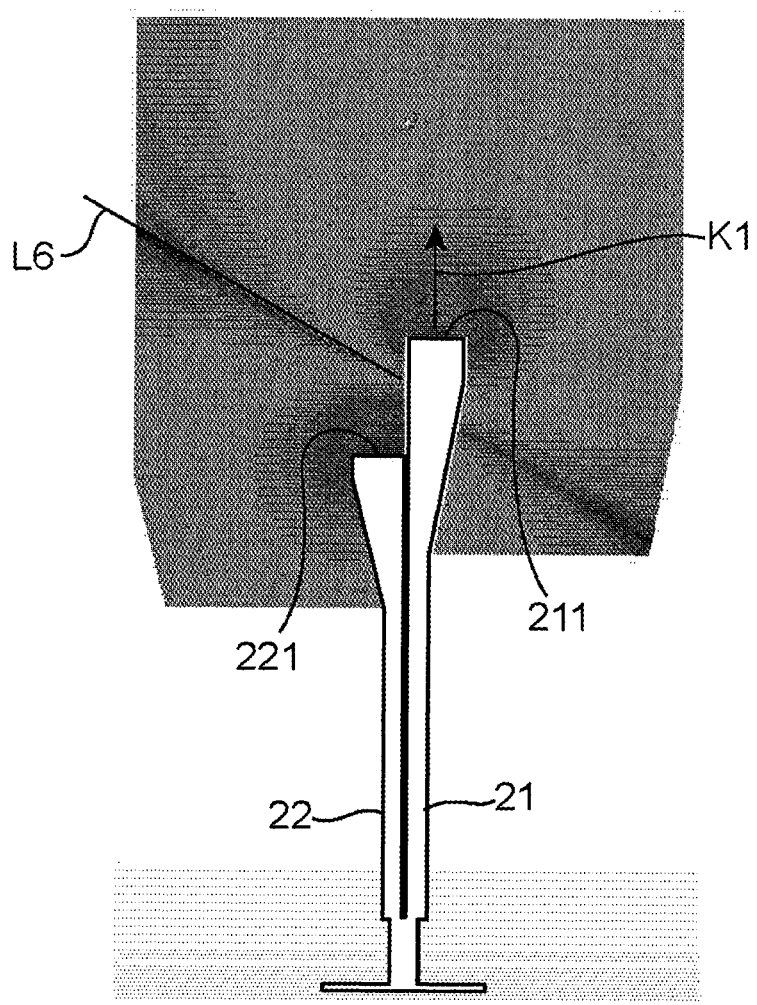
FIG. 6 is a diagram showing the sound pressure distribution of the resonance tube according to the embodiment of the present invention.

FIG. 6 is a diagram showing the sound pressure distribution of the resonance tube 2 according to the embodiment of the present invention. FIG. 6 is the same as FIG. 5 in that: there are two peaks in the vicinity of the respective first and second opening surfaces 211 and 221; and the sound pressure gradually decreases concentrically from each peak. However, since the first and second opening surfaces 211 and 221 are displaced from each other in the normal direction K1 in FIG. 6, the decrease of the sound pressure at the front side of the first and second opening surfaces 211 and 221 is not observed in FIG. 6, unlike FIG. 5. Further, it is shown in FIG. 6 that the sound pressure is symmetrical about a line L6 extending in an obliquely lower-right direction with respect to the longitudinal direction of the resonance tube 2, not about the line L5 extending forward from the first and second opening surfaces 211 and 221 as in FIG. 5.

As above, since the first and second opening surfaces 211 and 221 are displaced from each other in the normal direction K1, the resonance tube 2 can obtain the adequate sound pressure at the front side of the first and second opening surfaces 211 and 221.

Since the resonance tube 2 is attached to the vehicle such that the first and second opening surfaces 211 and 221 face the lower side of the vehicle, the resonance tube 2 can output the sound pressure having a level required as horn sound of the vehicle. It should be noted that: if a displacement amount between the first and second opening surfaces 211 and 221 in the normal direction K1 is too small, the above effect cannot be obtained; and the displacement amount is too large, a large installation space in the vehicle is required. Therefore, it is desirable that the displacement amount be set to a value which is as small as possible and can obtain the above effect.

Figure 7:
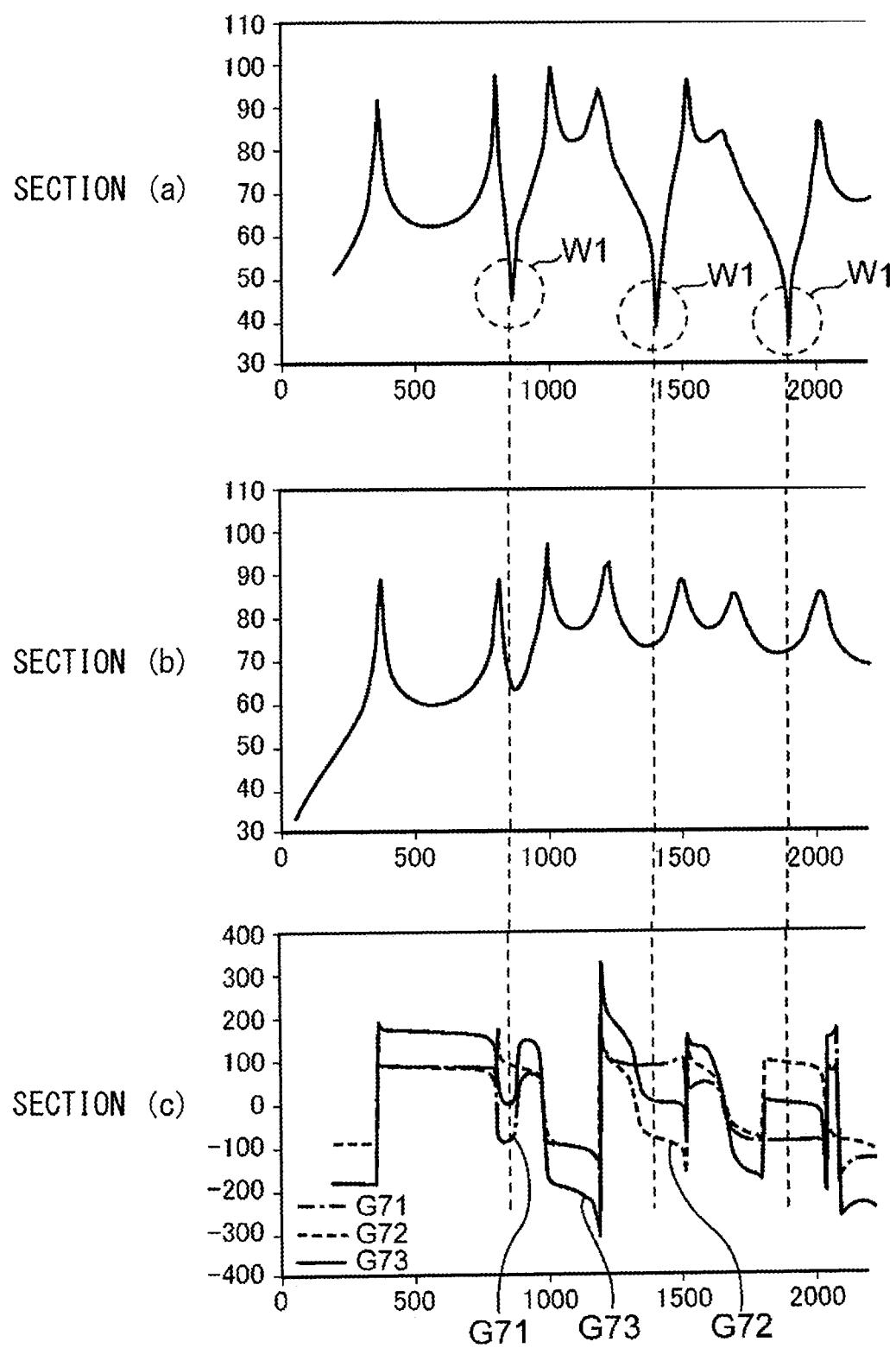
FIG. 7 shows graphs for comparing a frequency characteristic of the resonance tube of Comparative Example with a frequency characteristic of the resonance tube of the present embodiment.

FIG. 7 shows graphs for comparing a frequency characteristic of the resonance tube 2J of Comparative Example with a frequency characteristic of the resonance tube 2 of the present embodiment. In FIG. 7, Section (a) shows the frequency characteristic of the resonance tube 2J of Comparative Example, Section (b) shows the frequency characteristic of the resonance tube 2 of the present embodiment, and Section (c) shows a phase characteristic of the resonance tube 2J of Comparative Example.

In Sections (a) and (b) of FIG. 7, a vertical axis represents sound pressure, and a horizontal axis represents frequency. In Section (c) of FIG. 7, a vertical axis represents a phase, and a horizontal axis represents frequency. In Section (a) of FIG. 7, high peaks are observed at 800 Hz, 1000 Hz, 1200 Hz, 1500 Hz, 2000 Hz, etc. that are higher harmonic components of the fundamental frequency of the first or second sound. Target frequencies of the resonance tube 2J are 800 Hz and 1000 Hz each of which is the higher harmonic component that is twice the fundamental frequency, and it is shown that the adequate sound pressure is obtained at each of the target frequencies.

However, as shown by circular dotted-line regions W1, significant drop of the sound pressure is observed in the vicinity of each higher harmonic component and at a low frequency side of the higher harmonic component. In Section (c) of FIG. 7, a characteristic G71 represents a phase characteristic at the first opening surface 211, a characteristic G72 represents a phase characteristic at the second opening surface 221, and a characteristic G73 represents a phase difference between the characteristic G71 and the characteristic G72. It is shown that regarding the characteristic G73, the frequencies when the phase difference is zero coincide with the respective frequencies of the regions W1, and the drop of the sound pressure occurs at the frequencies when the phase difference is zero.

Figure 8:
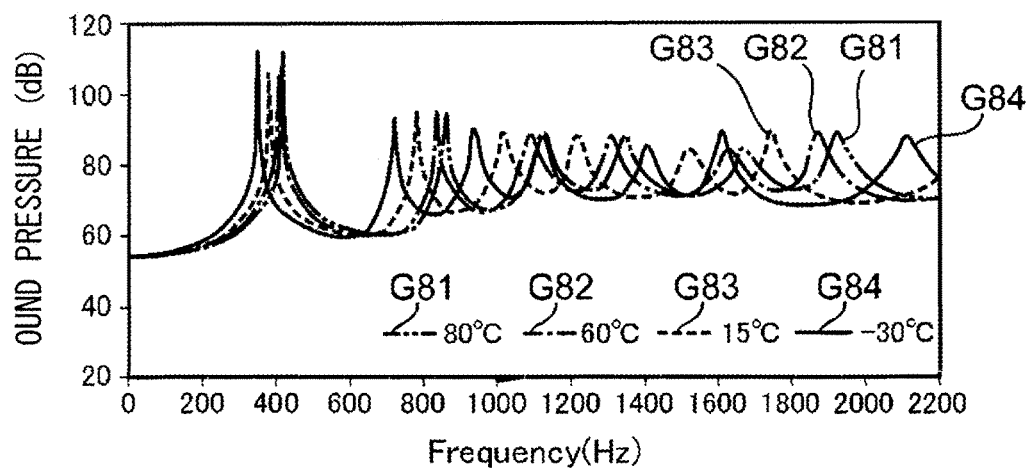
FIG. 8 is a graph showing the frequency characteristic of a general resonance tube depending on temperatures.

FIG. 8 is a graph showing the frequency characteristic of a general resonance tube depending on temperatures. In FIG. 8, characteristics G81, G82, G83, and G84 represent the frequency characteristics at temperatures of 80° C., 60° C., 15° C., and −30° C., respectively. In FIG. 8, a vertical axis represents sound pressure, and a horizontal axis represents frequency. FIG. 8 shows the frequency characteristic of one resonance tube that resonates with sound having the fundamental frequency of around 400 Hz.

In each of the characteristics G81 to G84, peaks are observed at the higher harmonic components, such as 400 Hz and 800 Hz. Further, it can be observed that as the temperature decreases, the peaks shift to the low-frequency side as a whole. It can also be observed that this shift amount is larger as the higher harmonic component becomes higher.

When the target frequency is 800 Hz, it is shown that: regarding each of the characteristics G82 and G83, the peak appears around 800 Hz; regarding the characteristic G81, the peak is largely displaced to the high-frequency side of 800 Hz; and regarding the characteristic G84, the peaks is largely displaced to the low-frequency side of 800 Hz.

Such temperature characteristics are true of general resonance tubes. Therefore, in the resonance tube 2J having the frequency characteristic in which the frequency largely drops around 800 Hz that is the target frequency as in Section (a) of FIG. 7, there is a problem regarding temperature dependence of the frequency. To be specific, if a drop position of the frequency characteristic coincides with 800 Hz due to the temperature around the resonance tube 2J, the adequate sound pressure cannot be secured at 800 Hz. Specifically, since the resonance tube 2J is mounted on the vehicle and therefore largely influenced by a temperature change of outside air, there is a considerable possibility that the drop position of the frequency characteristic coincide with the target frequency.

On the other hand, as shown in Section (b) of FIG. 7, in the resonance tube 2 of the present embodiment, slight drop of the sound pressure is observed at the low-frequency side of the peak indicating the higher harmonic component. However, it is shown that the drop of the sound pressure is significantly improved from the region W1. Specifically, it can be observed in FIG. 7 that: in Section (a), the drop of the sound pressure of the region W1 is lower than 50 dB; but in Section (b), the drop of the sound pressure is maintained at not less than 60 dB.

Therefore, even if the frequency at which the sound pressure drops due to the temperature change coincides with the target frequency, the resonance tube 2 can maintain the adequate sound pressure as the horn sound of the vehicle.

Figure 9:
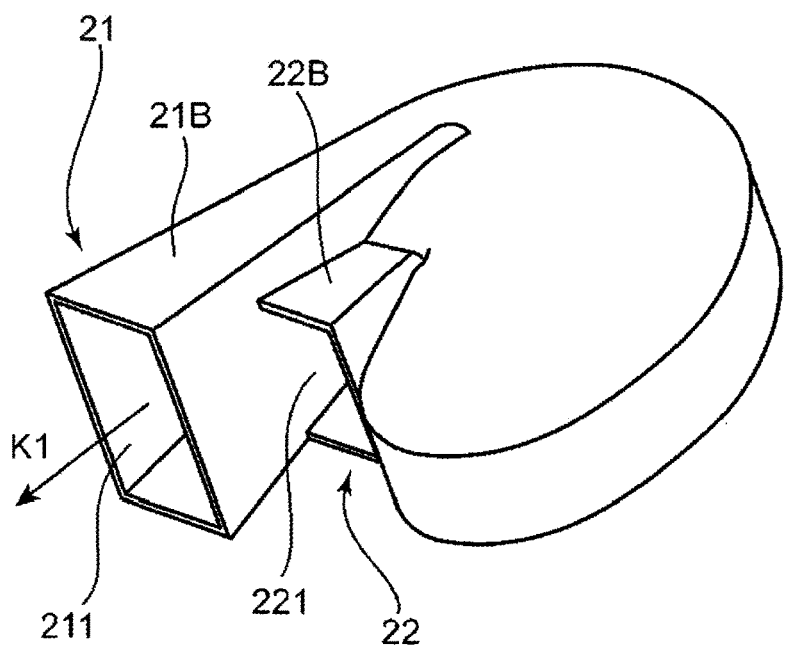
FIG. 9 is a diagram showing one example of the arrangement of first and second opening surfaces of the resonance tube according to the present embodiment.
Figure 9:
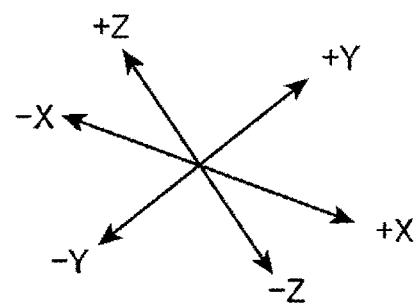

FIG. 9 is a diagram showing one example of the arrangement of the first and second opening surfaces 211 and 221 of the resonance tube 2 according to the present embodiment. In FIG. 9, only the first and second linear portions 21B and 22B are shown in detail, and the first and second spiral portions 21A and 22A are schematically shown.

In the example of FIG. 9, the second resonance tube 22 having a shorter entire length is wound at an inner side of the first resonance tube 21, and the second opening surface 221 is located at the +Y direction side of the first opening surface 211 in the normal direction K1. With this, the sound pressure at the front side (−Y direction side) of the first and second opening surfaces 211 and 221 is prevented from decreasing, and the sound pressure at the frequency around the peak is prevented from dropping.

The −X direction corresponds to a front side of the vehicle, the +X direction corresponds to a rear side of the vehicle, the −Y direction corresponds to a lower side of the vehicle, the +Y direction corresponds to an upper side of the vehicle, the −Z direction corresponds to a right side of the vehicle, and the +Z direction corresponds to a left side of the vehicle. To be specific, the horn 1 is attached to the vehicle such that the resonance tube 2 is positioned based on these directions.

Since the second linear portion 22B is not longer than the first linear portion 21B, there is a high possibility that water entering the second opening surface 221 reaches a −Y direction-side curved portion of the second spiral portion 22A (see FIG. 1). Since this curved portion is curved toward a direction of gravity, water accumulated in this curved portion cannot be discharged easily.

In the example of FIG. 9, the first linear portion 21B and the second linear portion 22B are lined up in the X direction, and the first linear portion 21B is arranged at the front side (−X direction side) of the second linear portion 22B in the vehicle. Therefore, the first linear portion 21B has a function of preventing water flying from the front side of the vehicle from entering the second opening surface 221.

However, in this case, there is a possibility that water flying from the left-right direction (Z direction) of the vehicle and the rear side (+X direction side) of the vehicle enters the second opening surface 221. Then, there is a possibility that since the second linear portion 22B of the second resonance tube 22 is short, the entered water is accumulated in the curved portion of the second spiral portion 22A which portion is curved toward the lower side of the vehicle.

Figure 10:
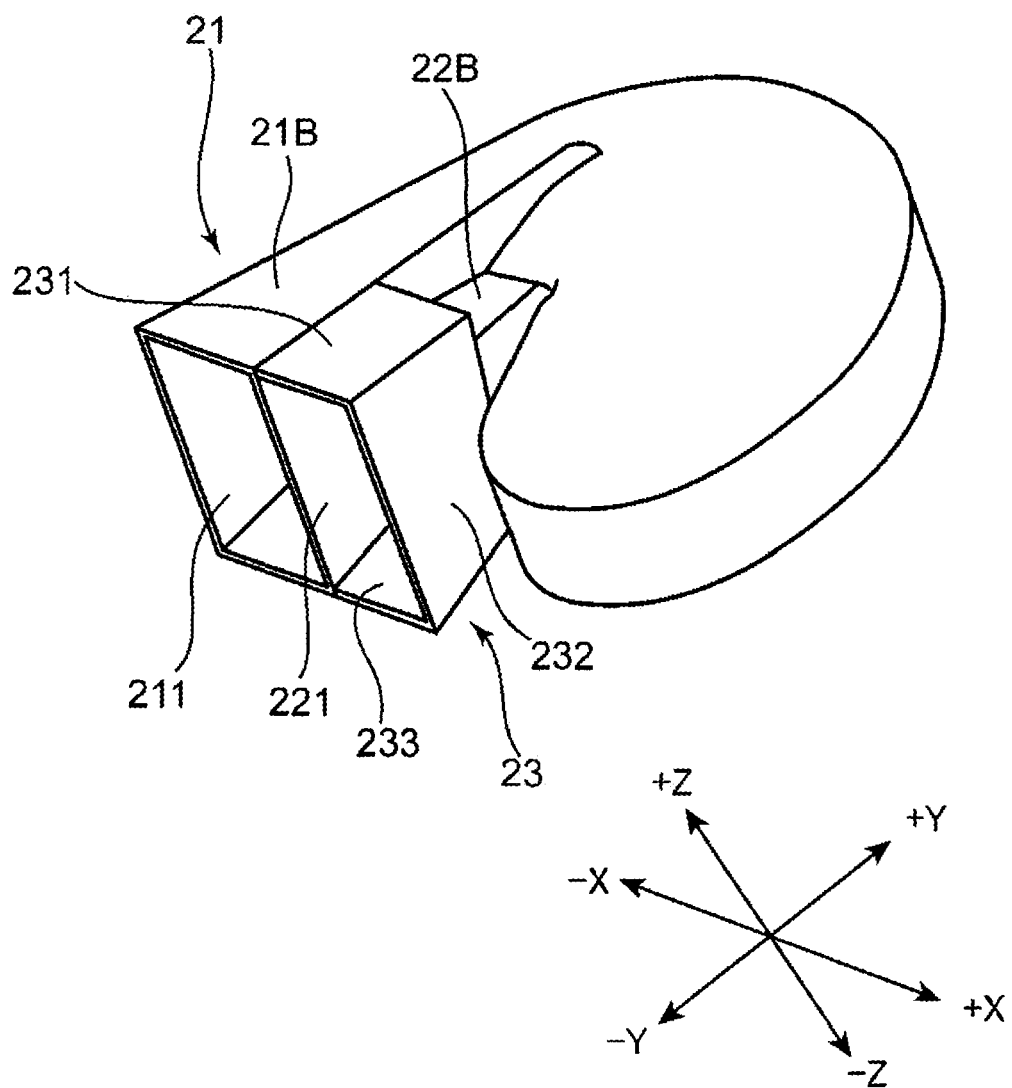
FIG. 10 is a diagram showing the resonance tube at which a cover is provided.

Therefore, in the present embodiment, as shown in FIG. 10, a cover 23 for preventing entry of water is provided at the second opening surface 221. FIG. 10 is a diagram showing the resonance tube 2 at which the cover 23 is provided. The cover 23 includes: a left wall 231 provided at the left side (+Z direction side) of the vehicle; a rear wall 232 provided at the rear side (+X direction side) of the vehicle; and a right wall 233 provided at the right side (−Z direction side) of the vehicle. Each of Y direction lengths of the left wall 231, the rear wall 232, and the right wall 233 is equal to a distance between the first opening surface 211 and the second opening surface 221. With this, water flying from the left, right, and rear sides of the vehicle can be prevented from entering the second opening surface 221 (FIG. 9).

If the left wall 231, the rear wall 232, and the right wall 233 are brought into tight contact with the second resonance tube 22, the length of the second resonance tube 22 is practically extended, and therefore, the second resonance tube 22 cannot resonate with the second sound. Therefore, the present embodiment adopts the following configuration.

Figure 11:
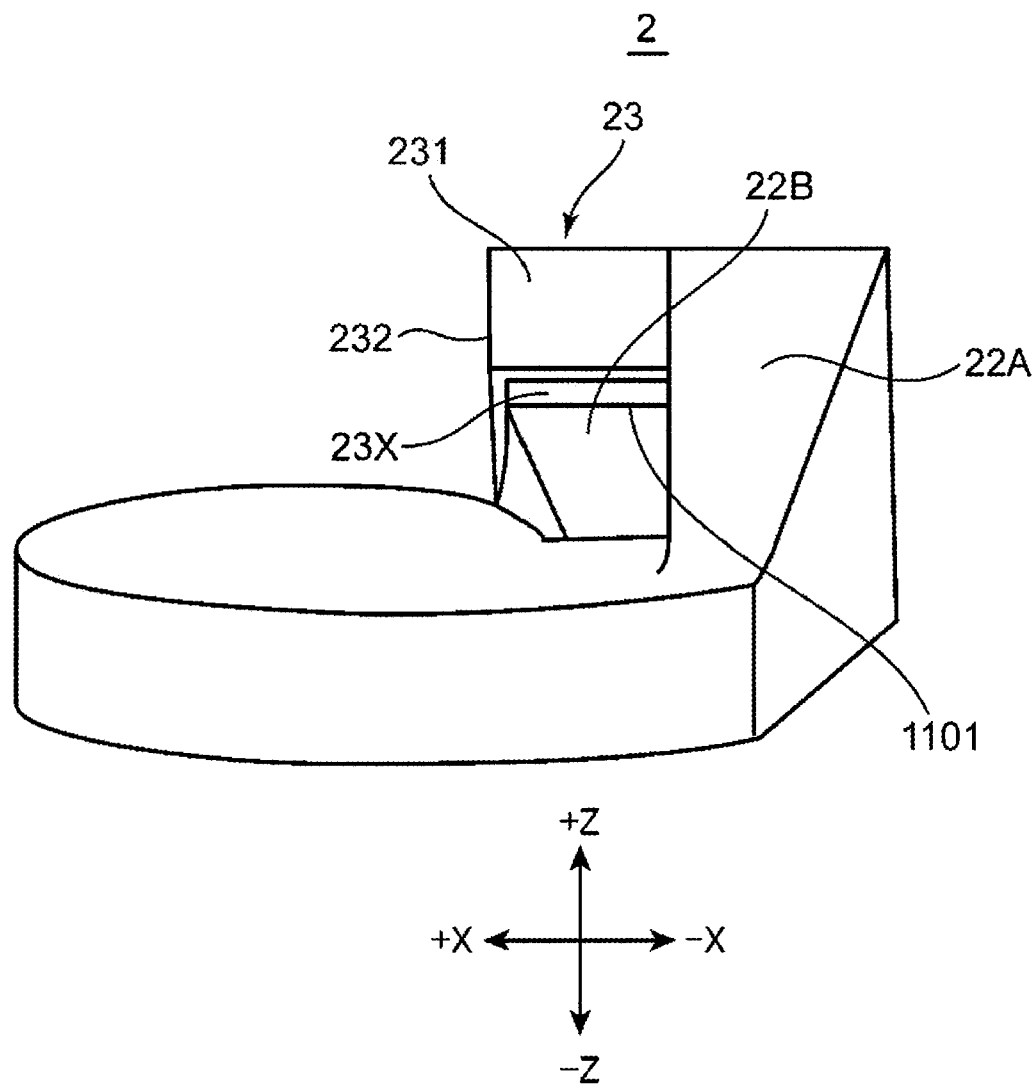
FIG. 11 is a diagram when viewing the resonance tube of FIG. 10 from an upper side of a vehicle.

FIG. 11 is a diagram when viewing the resonance tube 2 of FIG. 10 from the upper side of the vehicle. As shown in FIG. 11, the cover 23 is attached to the second linear portion 22B such that the left wall 231 is separated from a frame 1101 of the second opening surface 221 by a gap 23X. Specifically, a −X direction-side end portion of the left wall 231 is attached to a +X direction-side side surface of the first linear portion 21B. It should be noted that vehicle upper side end portions of the rear wall 232 and the right wall 233 are attached to the frame 1101, and a gap is not provided. With this, the length of the second resonance tube 22 is prevented from being extended practically, and the second resonance tube 22 is prevented from being unable to resonate with the second sound.

As explained above, since the first opening surface 211 is displaced from the second opening surface 221 in the normal direction K1, the resonance tube 2 can obtain the adequate sound pressure at the front side of the first and second opening surfaces 211 and 221. Further, as shown in Section (b) of FIG. 7, the drop of the sound pressure around the peak is improved. Therefore, even if the ambient temperature changes, and the target frequency coincides with the dropped frequency, the adequate sound pressure can be secured.

As shown in FIG. 2, since the input opening surface 212 is provided above the center O of the diaphragm 11, not above the support point 121a, the chord having high sound pressure is input to the input opening surface 212. Since the conventional diaphragm 11 in which the support point 121a is located at the center O of the diaphragm 11 largely vibrates at the support point 121a, the input opening surface 212 is provided above the support point 121a. On the other hand, in the present embodiment, as shown in FIG. 2, since the support point 121a is eccentric, the diaphragm 11 largely vibrates at the center O, not at the support point 121a. Therefore, in the present embodiment, the input opening surface 212 is provided above the center O, not above the support point 121a. With this, high sound pressure can be input to the input opening surface 212.

MODIFIED EXAMPLES (1) The foregoing has explained that as shown in FIG. 1, the second resonance tube 22 branches from the first resonance tube 21. However, the first resonance tube 21 may branch from the second resonance tube 22. In this case, the entire length of the branched first resonance tube 21 is only required to be made longer than the entire length of the second resonance tube 22 such that the branched first resonance tube 21 resonates with the first sound having the lower fundamental frequency than the second sound.

(2) In FIG. 1, the second opening surface 221 is displaced from the first opening surface 211 in the +Y direction along the normal direction K1 but may be displaced in the −Y direction. To be specific, the first and second opening surfaces 211 and 221 are only required to be displaced from each other in the Y direction, and there is no relationship in which a predetermined one of the first and second opening surfaces 211 and 221 must be displaced from the other of the first and second opening surfaces 211 and 221 in the +Y direction or the −Y direction.

(3) The foregoing has explained that the fundamental frequency of the first sound is lower than the fundamental frequency of the second sound. However, the fundamental frequency of the first sound may be higher than the fundamental frequency of the second sound. For example, the fundamental frequency of the first sound may be 500 Hz, and the fundamental frequency of the second sound may be 400 Hz. In this case, the first resonance tube 21 is only required to have such an entire length as to resonate with 400 Hz or the higher harmonic component of 400 Hz (for example, 800 Hz), and the second resonance tube 22 is only required to have such an entire length as to resonate with 500 Hz or the higher harmonic component of 500 Hz (for example, 1000 Hz).

(4) The foregoing has explained that the first and second opening surfaces 211 and 221 are parallel to each other. However, this is just one example, and the first and second opening surfaces 211 and 221 may be more or less non-parallel to each other. From the viewpoint of making output directions of the first and second sounds parallel to each other, it is desirable that the first and second opening surfaces 211 and 221 be parallel to each other.

(5) The foregoing has explained that the first and second opening surfaces 211 and 221 are adjacent to each other. However, the first and second opening surfaces 211 and 221 may be more or less away from each other. From the viewpoint of a size reduction of the horn 1, it is desirable that the first and second opening surfaces 211 and 221 be adjacent to each other.

(6) One or both of the first and second linear portions 21B and 22B explained above may be omitted. In this case, one or both of end surfaces of the first and second spiral portions 21A and 22A serve as the first opening surface 211 and/or the second opening surface 221.

REFERENCES CHARACTERS LIST

K1, K2 normal direction
1 horn
2 resonance tube
10 sound source device
11 diaphragm
12 movable core
21 first resonance tube
21A first spiral portion
21B first linear portion
21C base portion
22 second resonance tube
22A second spiral portion
22B second linear portion
23 cover
23X gap
211 first opening surface
212 input opening surface
213 branching portion
221 second opening surface

The invention claimed is:

1. A resonance tube of a horn mounted on a vehicle, the resonance tube comprising:
a main resonance tube including an input opening surface to which a chord is input, the chord containing a first sound and a second sound, the first sound having a first frequency as a fundamental frequency, the second sound having a second frequency as a fundamental frequency, the second frequency constituting the chord together with the first frequency; and
a branch resonance tube branching from the main resonance tube, wherein:
one of the main resonance tube and the branch resonance tube serves as a first resonance tube that resonates with the first sound;
the other of the main resonance tube and the branch resonance tube serves as a second resonance tube that resonates with the second sound;
the first resonance tube includes a first opening surface from which the resonated first sound is output;
the second resonance tube includes a second opening surface from which the resonated second sound is output; and
the second opening surface is displaced from the first opening surface in a normal direction of the first opening surface.

2. The resonance tube according to claim 1, wherein:
the first resonance tube includes
a first spiral portion extending spirally and
a first linear portion extending linearly toward a lower side of the vehicle from the first spiral portion to the first opening surface; and
the second resonance tube includes
a second spiral portion extending spirally and
a second linear portion extending adjacent to the first linear portion from the second spiral portion to the second opening surface such that the second opening surface is located at an upper side of the first opening surface in the vehicle,
the resonance tube further comprising a cover covering the second opening surface to prevent entry of water.

3. The resonance tube according to claim 2, wherein the cover is attached to the second linear portion with a gap from a frame of the second opening surface.

4. The resonance tube according to claim 1, wherein:
the first and second resonance tubes are spirally arranged adjacent to each other;
one of the first and second resonance tubes has a longer entire length than the other of the first and second resonance tubes; and
the other of the first and second resonance tubes is wound at an inner side of the one of the first and second resonance tubes.

5. The resonance tube according to claim 1, wherein:
the chord is generated by a diaphragm in which a support point of a movable core is provided at a position that is eccentric from a center of the diaphragm; and
the input opening surface is provided above the center of the diaphragm.

6. The resonance tube according to claim 2, wherein:
the first and second resonance tubes are spirally arranged adjacent to each other;
one of the first and second resonance tubes has a longer entire length than the other of the first and second resonance tubes; and
the other of the first and second resonance tubes is wound at an inner side of the one of the first and second resonance tubes.

7. The resonance tube according to claim 2, wherein:
the chord is generated by a diaphragm in which a support point of a movable core is provided at a position that is eccentric from a center of the diaphragm; and
the input opening surface is provided above the center of the diaphragm.

* * * * *